US006011964A

United States Patent [19]

Saitoh

[11] Patent Number: 6,011,964

[45] Date of Patent: Jan. 4, 2000

[54] HELICAL ANTENNA FOR A PORTABLE RADIO APPARATUS

[75] Inventor: Tetsuya Saitoh, Saitama, Japan

[73] Assignee: NEC Corporation, Tokyo, Japan

[21] Appl. No.: 08/920,830

[22] Filed: Aug. 29, 1997

[30] Foreign Application Priority Data

Aug. 30, 1996 [JP] Japan .................................... 8-231189

[51] Int. Cl.$^{7}$ ........................................ H04Q 7/20

[52] U.S. Cl. ............................ 455/269; 343/895

[58] Field of Search ........................ 343/895, 749, 343/745, 702, 843, 866, 896, 729; 455/90, 575, 269, 550, 19, 25, 96

[56] References Cited

U.S. PATENT DOCUMENTS

| | | | |
|---|---|---|---|
| 3,852,759 | 12/1974 | Felsenheld | 343/729 |
| 4,313,119 | 1/1982 | Garay et al. . | |
| 4,644,366 | 2/1987 | Scholz | 343/702 |
| 4,924,238 | 5/1990 | Ploussios . | |
| 5,187,488 | 2/1993 | Van Der Vis | 343/747 |
| 5,444,455 | 8/1995 | Louzir et al. | 343/729 |
| 5,521,607 | 5/1996 | Deasy . | |
| 5,612,704 | 3/1997 | Cole | 343/702 |
| 5,668,559 | 9/1997 | Baro | 343/895 |
| 5,691,730 | 11/1997 | Egashira et al. | 343/702 |
| 5,694,140 | 12/1997 | Waterman et al. | 343/895 |
| 5,701,129 | 12/1997 | Itou et al. | 343/895 |
| 5,708,448 | 1/1998 | Wallace | 343/895 |
| 5,739,792 | 4/1998 | Hassemer et al. | 343/702 |
| 5,818,392 | 11/1995 | Oka et al. | 343/702 |
| 5,825,330 | 1/1996 | Na et al. | 343/895 |
| 5,859,617 | 6/1996 | Fujikawa | 343/895 |

FOREIGN PATENT DOCUMENTS

| | | |
|---|---|---|
| 57-171304 | 10/1983 | Japan . |
| 59-177207 | 11/1984 | Japan . |
| 60-30646 | 3/1985 | Japan . |
| 2 147 147 | 5/1985 | United Kingdom . |
| 2 257 569 | 1/1993 | United Kingdom . |

*Primary Examiner*—William G. Trost
*Assistant Examiner*—Jean A. Gelin
*Attorney, Agent, or Firm*—Scully, Scott Murphy & Presser

[57] ABSTRACT

A helical antenna is provided for portable radio apparatus characterized in having one communication band switch and having two separated communication bands, or a broad communication band. The helical antenna comprises a screw shaped emitting element having one power supply terminal and two communication band switching terminals, a switch which short circuits and disconnects the two communication band switching terminals, and a switch drive circuit which drives this switch, and in accordance with an externally applied signal, the switch drive circuit short circuits or disconnects the switch, and by means of the disconnection or short circuiting of the two communication band switching terminals, the resonance frequency is switched.

6 Claims, 9 Drawing Sheets

HELICAL ANTENNA FOR A PORTABLE RADIO APPARATUS

BACKGROUND OF THE INVENTION

1. Field of the Invention

The present invention relates to an antenna for portable radio apparatuses, and in particular, relates to a helical antenna for portable radio apparatuses which receives signals in two separated communication bands or in a broad communication band.

2. Background Art

In conventional antennas for portable radio apparatuses, a technology for the miniaturization of the wire antenna was widely employed in which the emitting conductor was formed in a screw shape, producing a helical antenna. Furthermore, in concert with the reduction in size of portable radio apparatuses, it has become necessary to realize smaller helical antennas; however, as the size of the helical antennas is reduced, the band width becomes narrow, and it becomes difficult to cover the band width required of portable radio apparatuses.

In particular, in portable radio apparatuses having two or more separated communication bands, an antenna having an even wider band width is necessary in order to cover these bands, and this presents an obstacle to a reduction in size of the antenna. On the other hand, various methods have been considered for changing the antenna structure so as to provide two communication bands; however, these require approximately the same volume as providing two antenna elements, so that the need for size reduction is not met.

In order to make an antenna having a narrow communication band into an antenna capable of being employed for two separated communication bands, in Japanese Utility Model Application, First Publication No. Sho. 56-95107, a ferrite bar antenna is used, as shown in FIG. 8; by short circuiting a portion of coil wrapped around the bar and changing the resonance frequency of the antenna, two communication bands can be received. However, if the circuit structure shown in FIG. 8 is employed, the resonance frequency is determined by the number of turns of coil 23 and the capacity of capacitors 27 and 28 which are connected in parallel, so that in order to change the resonance frequency, a switch 26 for short circuiting a portion of the antenna and the ground, and a switch 29 for switching the capacitors, are necessary. Furthermore, by changing the resonance frequency, the position of the feeder terminal changes, so that it is also necessary to switch the feeder terminal, and switch 30 is required for this purpose, so that a total of 3 switches are necessary, and thus the communication band switching circuitry becomes complicated, requiring a large surface area for installation. The signals received in this manner are combined with a signal from a local oscillator 34 which is not depicted in the figure to create an intermediate frequency, and this is supplied to an intermediate frequency amplification circuit which is not depicted in the figure.

On the other hand, FIG. 9 shows an antenna disclosed in Japanese Utility Model Application, First Publication No. Hei. 4-10412. In this antenna, as shown in the figure, a conducting plate 56 is inserted within the helical antenna, shorting a portion of the helical antenna, and thereby changing the resonance frequency; however, when this method is employed, the resonance frequency can only be altered during the process of production, and such an antenna can not be used in portable radio apparatuses which conduct reception in such a manner as to switch the frequency of the antenna among two communication bands during use.

With the conventional methods such as those described above, the number of switches used to switch the resonance frequency of the antenna was large, and the circuitry became complex, so that the surface area required for installation of the portion used for switching the communication bands of the antenna was large, and the size of the antenna and the peripheral circuitry thereof increased, so that such methods were not applicable to portable radio apparatuses. Furthermore, when the antenna was made to have two resonance frequencies, this caused a problem in that volume of the antenna was excessively large.

The present invention was created in light of the above circumstances; it has as an object thereof to provide a helical antenna for portable radio apparatuses which is characterized in having a single communication band switching switch and having either two separated bands or a broad communication band.

SUMMARY OF THE INVENTION

The first aspect of the present invention provides a helical antenna for portable radio apparatuses characterized in having a screw shaped emitting element having one feeder terminal and two communication band switching terminals, a switch which short circuits and disconnects these two communication band switching terminals, and a drive circuit which drives this switch; said drive circuit short circuits or disconnects said switch in accordance with signals applied externally, and by means of the disconnection or short circuiting between the two communication band switching terminals, the resonance frequency is switched.

The second aspect of the present invention is characterized in that, in a helical antenna for portable radio apparatuses, one of the communication band switching terminals is made common with the feeder terminal.

The third aspect of the present invention is characterized in that, in a helical antenna for portable radio apparatuses, said switch is directly short circuited or disconnected by means of signals externally applied.

DESCRIPTION OF THE PREFERRED EMBODIMENTS

Figure 1:
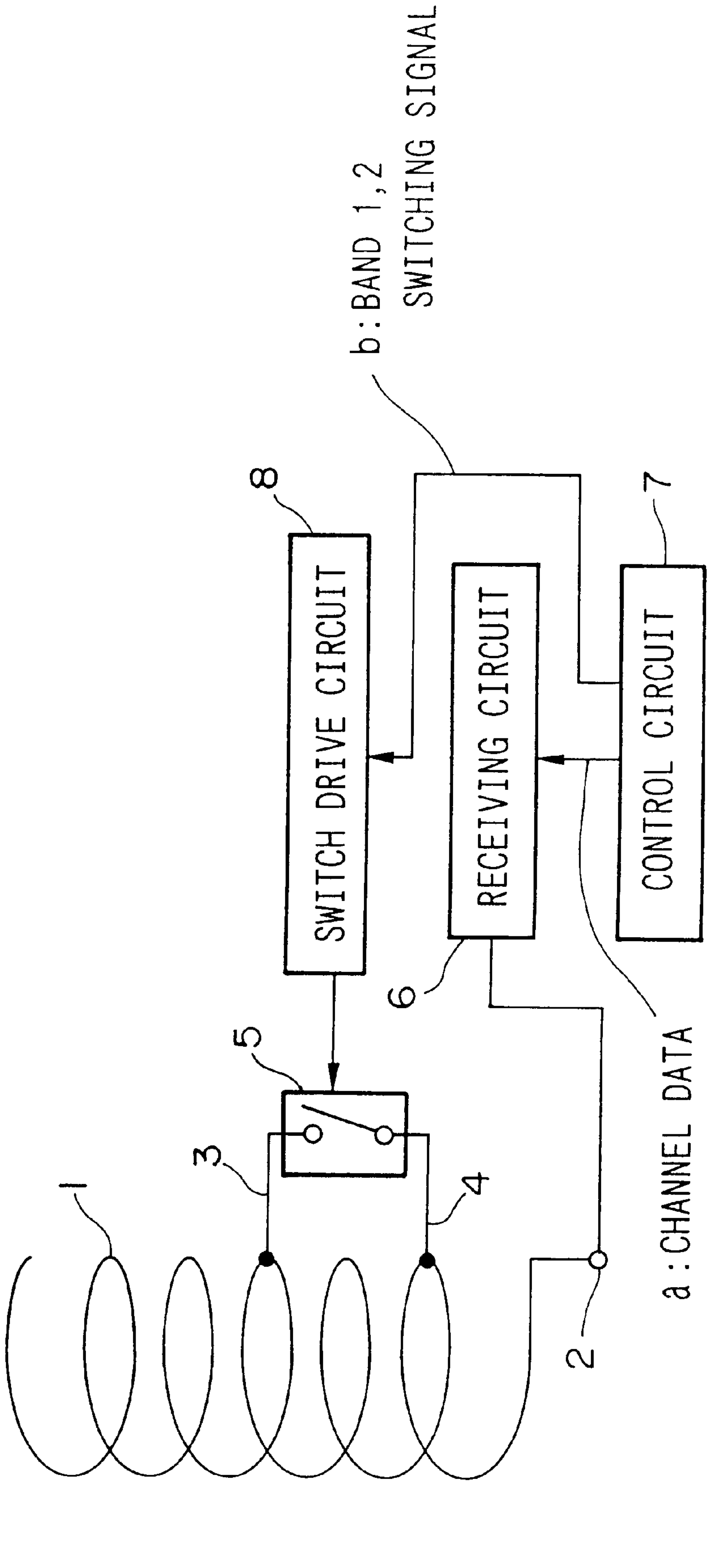
FIG. 1 is a block diagram showing the structure of a helical antenna for portable radio apparatuses, and the peripheral circuitry thereof, in accordance with the first embodiment of the present invention.

FIG. 1 is a block diagram showing the structure of a helical antenna for portable radio apparatuses and the peripheral circuitry thereof in accordance with a first embodiment of the present invention. In the figure, reference 1 indicates the helical antenna, which is provided with a feeder terminal 2 and communication band switching terminals 3 and 4. Reference 5 indicates the communication band switching switch, which short circuits or disconnects terminals 3 and 4. Reference 6 indicates a receiving circuit; it is connected to feeder terminal 2, and conducts high frequency amplification, frequency conversion, and demodulation of the reception frequency. Reference 7 indicates a control circuit; it sends the channel data to the receiving circuit 6 and determines the reception frequency, and controls switch drive circuit 8.

Figure 2A:
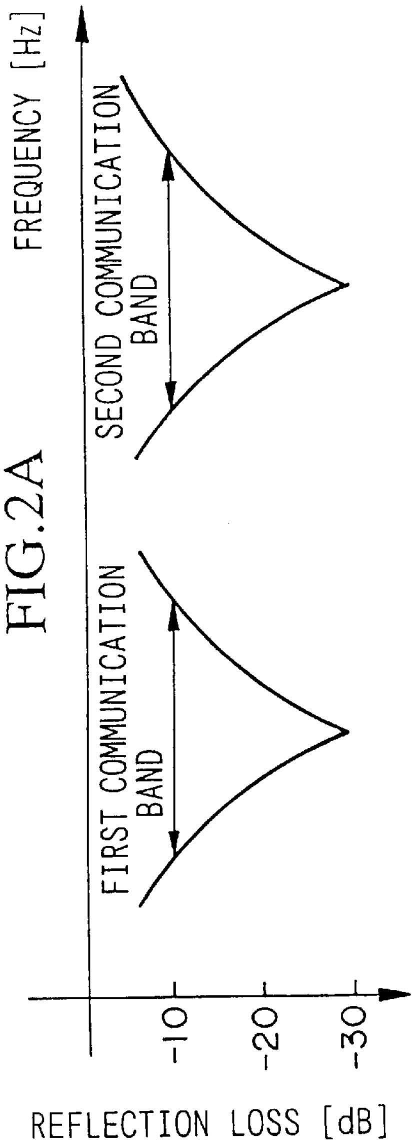
FIGS. 2A and 2B are diagrams showing the characteristics of the helical antenna of FIG. 1.

Next, the operation of the first embodiment of the present invention will be explained in detail with reference to FIGS. 1 and 2. FIG. 2 shows the characteristics of the helical antenna of FIG. 1; FIG. 2A shows the case in which the first communication band and the second band are separated, while FIG. 2B shows the case in which the first communication band and second communication band are near to one another and form a single broad communication band.

Figure 2B:
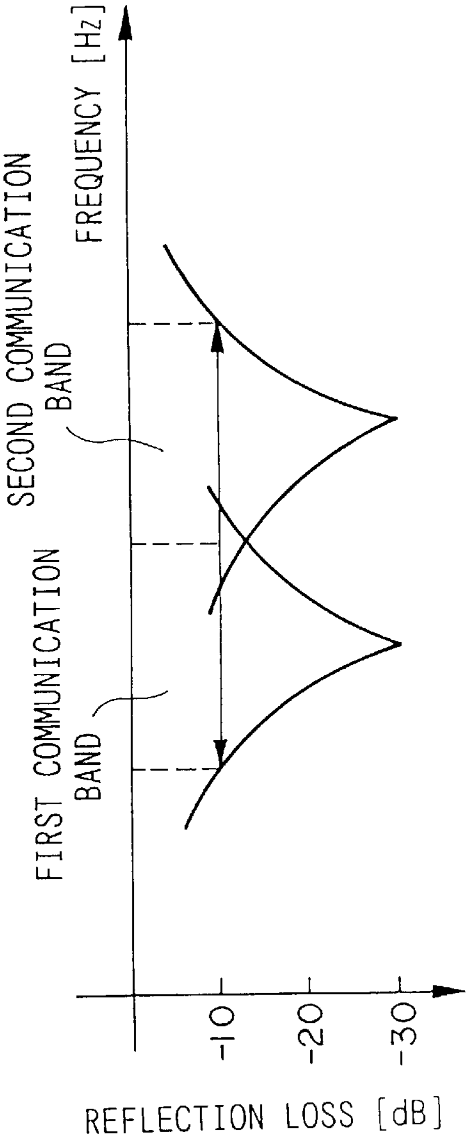

First, when the reception frequency is in the first communication band of FIG. 2A or 2B, the channel data, which determines the reception of frequency, are sent from control circuit 7 to receiving circuit 6, which operates as a receiving circuit for the first communication band. Furthermore, a communication band switching signal (for example, LOW level) linked to these channel data is applied to switch drive circuit 8 from control circuit 7, switch 5 is opened by switch drive circuit 8, and the antenna functions as a helical antenna for the first communication band. For this reason, the reception frequency of the first communication band received by helical antenna 1 passes through feeder terminal 2 and is demodulated in receiving circuit 6. Next, when the reception frequency is in the second communication band, channel data of the reception frequency are sent to receiving circuit 6 from control circuit 7, and circuit 6 operates as a receiving circuit for the second communication band. Simultaneously, a switching signal for a band opposite to the first communication band (for example, HIGH level) which is linked to these channel data is applied to switch drive circuit 8, switch 5 closes the connection between communication band switching terminals 3 and 4 by means of switch drive circuit 8, and as a result of the reduction in the effective length of the helical antenna, the resonance frequency becomes high, and the antenna functions as a helical antenna for the second communication band.

The reception frequency of the second communication band received by helical antenna 1 passes through feeder terminal 2 and is demodulated in receiving circuit 6. Here, by means of adjusting the total length of the helical antenna 1, it is possible to modulate the frequency of the first communication band, and by altering the position of communication band switching terminals 3 and 4, it is possible to obtain a desired communication band gap between the first communication band and the second communication band. If the frequency is plotted on the horizontal axis while the reflection loss of the antenna is plotted on the vertical axis, then the reflection loss characteristics of the helical antenna can be made to cover two bands, as shown in FIG. 2A. Furthermore, by overlapping the first communication band and the second communication band, as shown in FIG. 2B, it is possible to operate the antenna as a broad band helical antenna.

Figure 3:
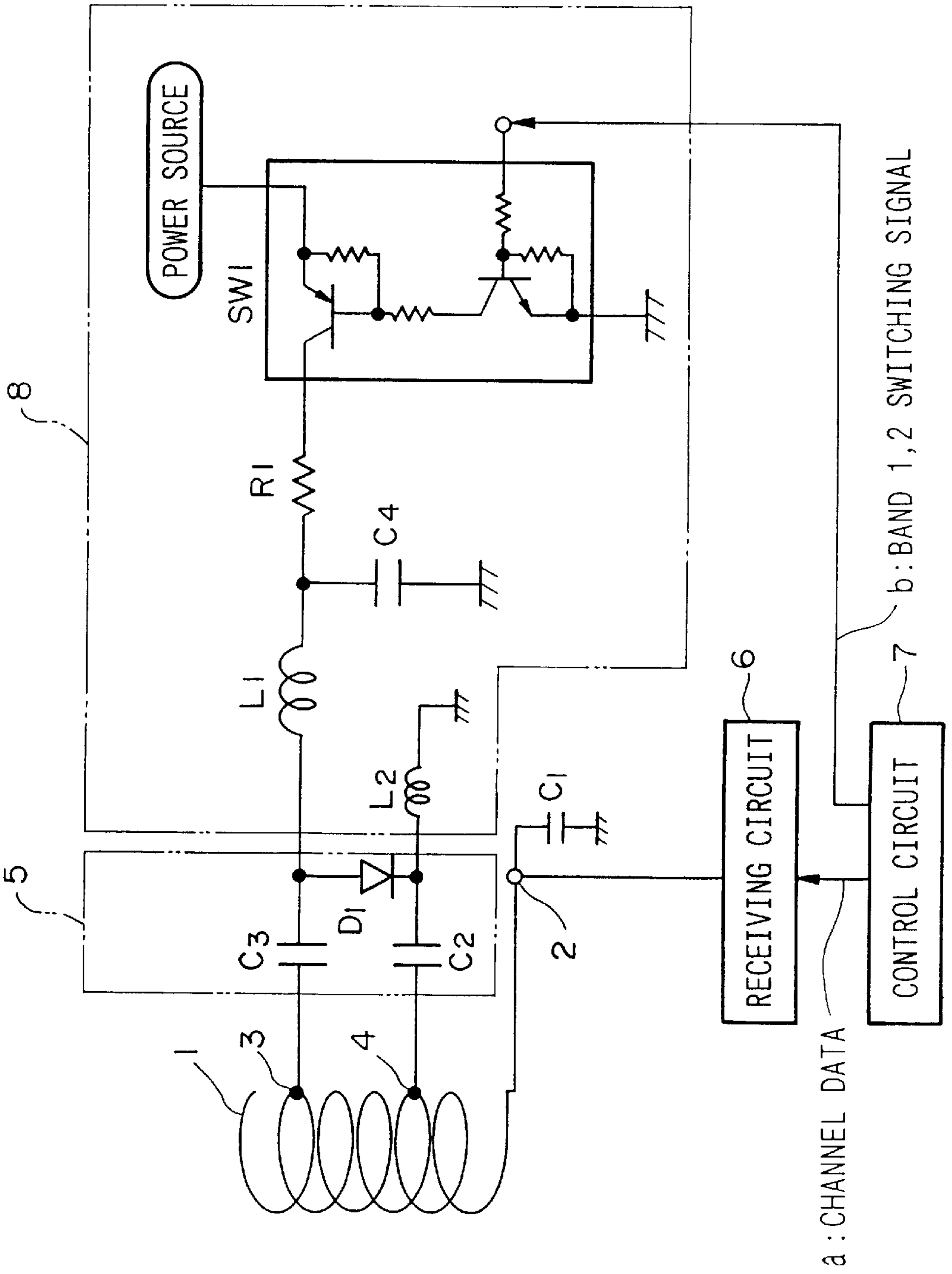
FIG. 3 shows a concrete circuit diagram of the communication band switch of FIG. 1 and the switch drive circuit portion.

FIG. 3 is a concrete circuit diagram of the communication band switching switch 5 and the parts of the switch drive circuit 8 of FIG. 1. Here, the switch 5 of helical antenna 1 comprises a diode. In the figure, the capacitors C2 and C3 are selected so that the impedances thereof in the reception frequency band are sufficiently low, and the choke coils L1 and L2 are selected so that impedances thereof are sufficiently high. Furthermore, capacitor C4 is also selected so that the impedance thereof is sufficiently low in the reception frequency band.

The operation of FIG. 3 is such that, first, when the band switching signal outputted from control signal 7 is at the HIGH level, semiconductor switch SW1 enters an ON state, current flows to diode D1 and diode D1 enters an ON state. At this time, capacitors C2 and C3 are selected so as to exhibit sufficiently low impedance in the reception frequency band so that communication band switching terminals 3 and 4 are shorted in a high frequency manner, and the resonance frequency of the antenna becomes high. Furthermore, L1 and L2 exhibit sufficiently high impedances in the reception frequency band, so that the effects of impedance of the circuitry on the power source supply side can be effectively ignored.

Next, when the band switching signal is at a LOW level, SW1 enters an OFF state, and no current flows, so that diode D1 has a high impedance, disconnection occurs between communication band switching terminals 3 and 4, and the resonance frequency of the antenna becomes low. Diode D1 has the characteristic that as the current flowing thereto increases, the impedance in the ON state becomes lower. For this reason, the value of resistor R1 is determined so that a current will flow which causes the impedance of diode D1 in the ON state to reach a desired value.

In the case shown in FIG. 3, in a portable radio employing a communication system in which reception is conducted in a first communication band having a low frequency during reception and using the specified frequencies of communication bands 1 and 2 only during the transmission state, current flows to the communication band switching circuit only when the second communication band having a high frequency is selected during transmission, so that this produces a great effect in that it is possible to reduce the power consumption during reception.

Capacitor C1 has a capacitance for helical antenna matching which is on the order of a few picofarads. Furthermore, the capacities of capacitors C2 and C3 and choke coils L1 and L2 are selected appropriately in accordance with the frequency bands employed; however, in communications in a frequency band on the order of 1800 MHz, the values of these elements should be such that the capacitors C2 and C3 are on the level of 100 picofarads, while the choke coils L1 and L2 should be on the order of 100 nanohenrys. In this embodiment of the invention, diodes were employed for the communication band switches, so that switch drive circuits were necessary; however, when elements which are directly controllable by the control circuits are used, for example, GaAs semiconductor switches or the like, it is possible to omit the switch drive circuits.

Figure 4:
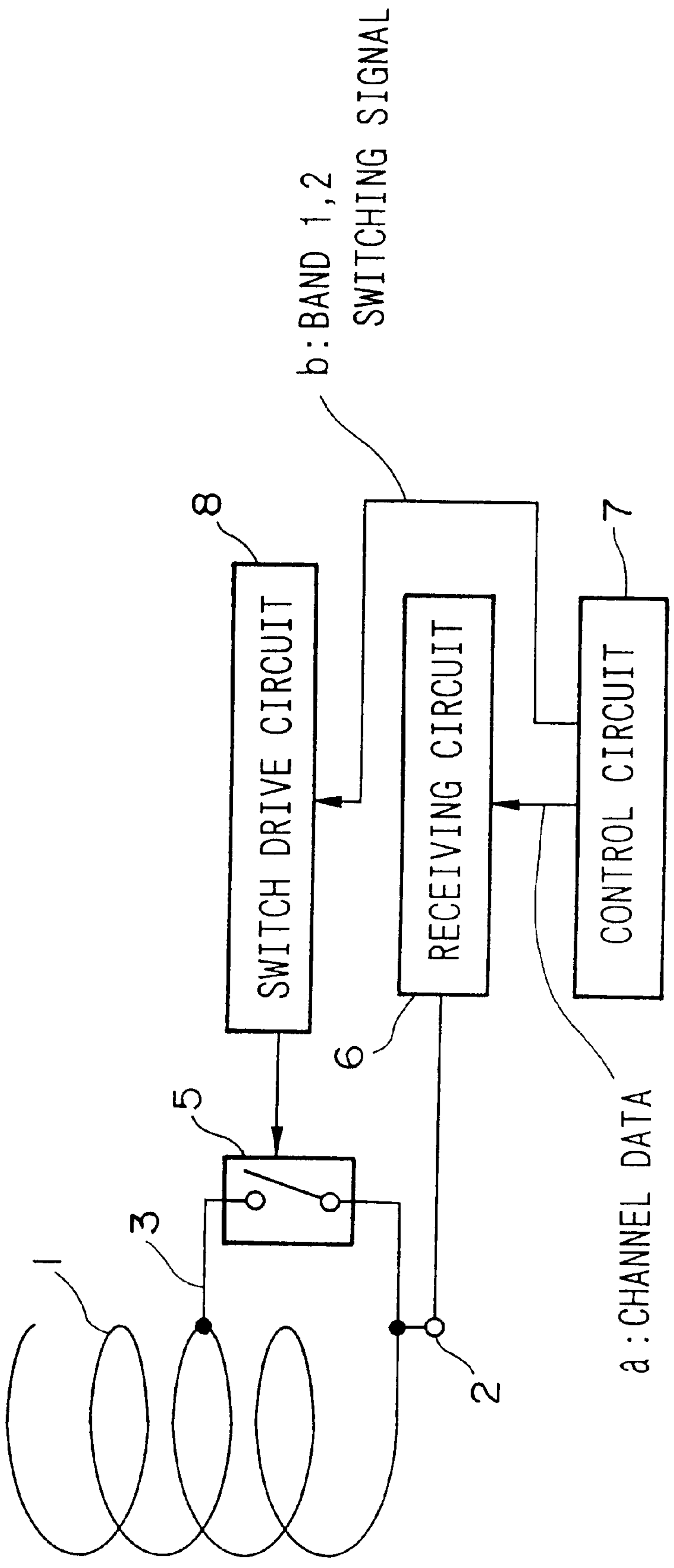
FIG. 4 is a block diagram showing the structure of a helical antenna for a portable radio apparatus, and the peripheral circuitry thereof, in accordance with the second embodiment of the present invention.

FIG. 4 shows the second embodiment of the present invention. At frequencies on the order of 1800 MHz, if there is not sufficient distance between the helical antenna and the communication band switching circuit, this may cause interruption in the emission of the radio wave from the helical antenna; however, by making one of the communication band switching terminals common with the power supply terminal, it is possible to install the communication band switch in the vicinity of the power supply terminal side of the helical antenna, and there will be no interruption in the emission from the helical antenna. In this case, as well, by adjusting the total length of helical antenna 1, it is possible to adjust the frequency of the first communication band, and by means of altering the position of the communication band switching terminal 3, it is possible to obtain the desired communication band gap between communication bands 1 and 2.

In the foregoing, the operation of two embodiments of the present invention was described in detail with reference to the figures; however, the concrete structure is not limited to these embodiments, and design modifications may be included in the scope of the present invention insofar as they do not alter the essential features of the present invention.

Figure 5:
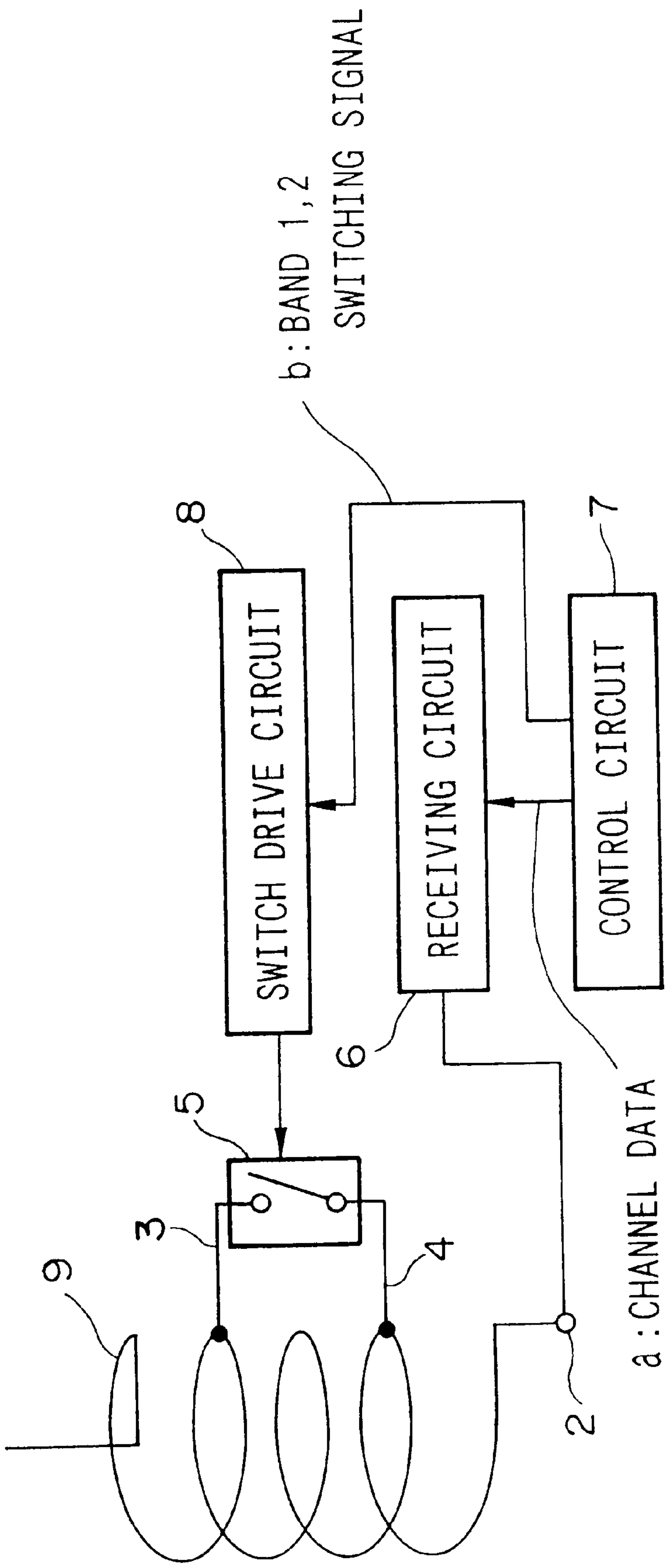
FIG. 5 is a block diagram showing a helical antenna for a portable radio apparatus in which a portion of the antenna element is made straight in accordance with the third embodiment of the present invention.
Figure 6:
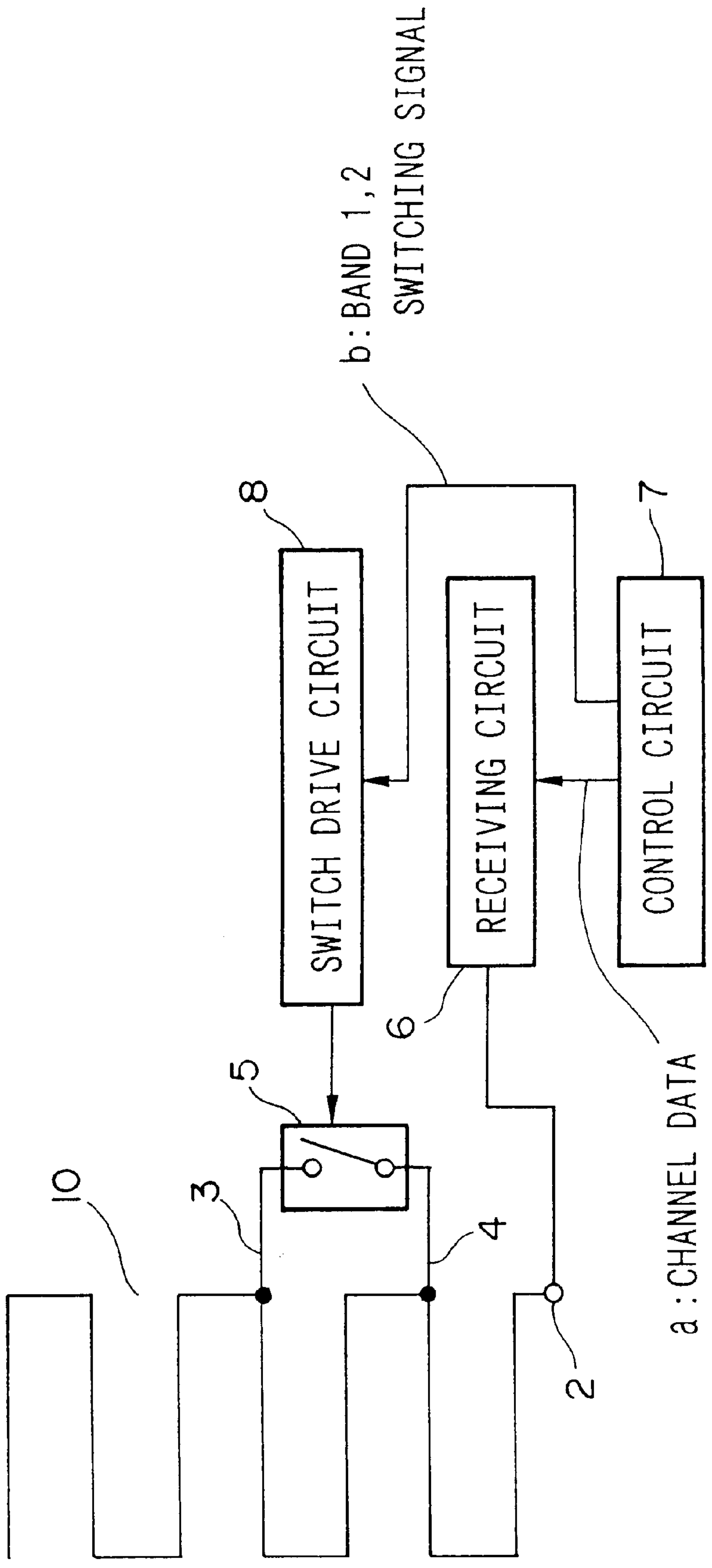
FIG. 6 is a block diagram showing the structure of a helical antenna for a portable radio apparatus which is formed so as to be in the same plane in accordance with a fourth embodiment of the present invention.
Figure 7:
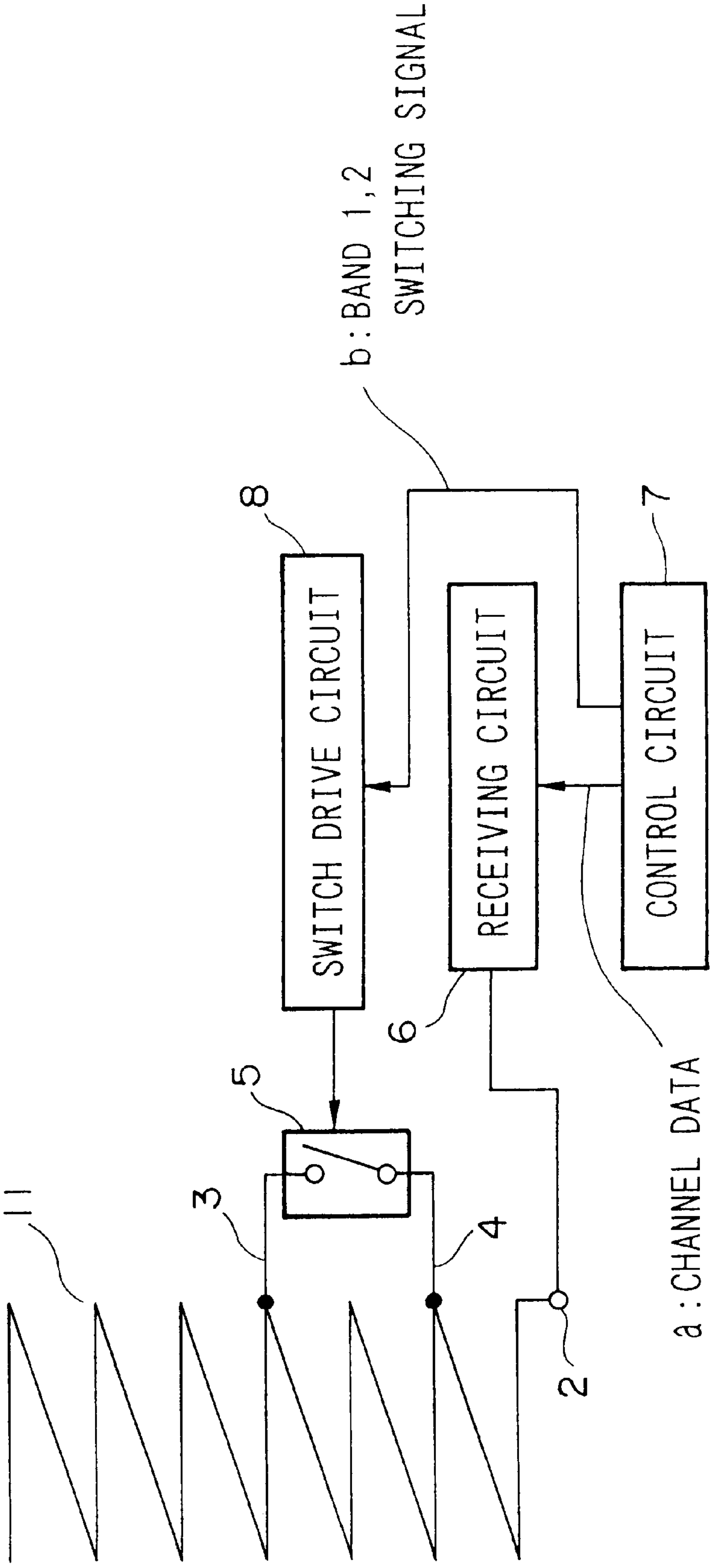
FIG. 7 is a block diagram showing the structure of a helical antenna for a portable radio apparatus in which the antenna element is formed in a zigzag shape in accordance with the fourth embodiment of the present invention.
Figure 8:
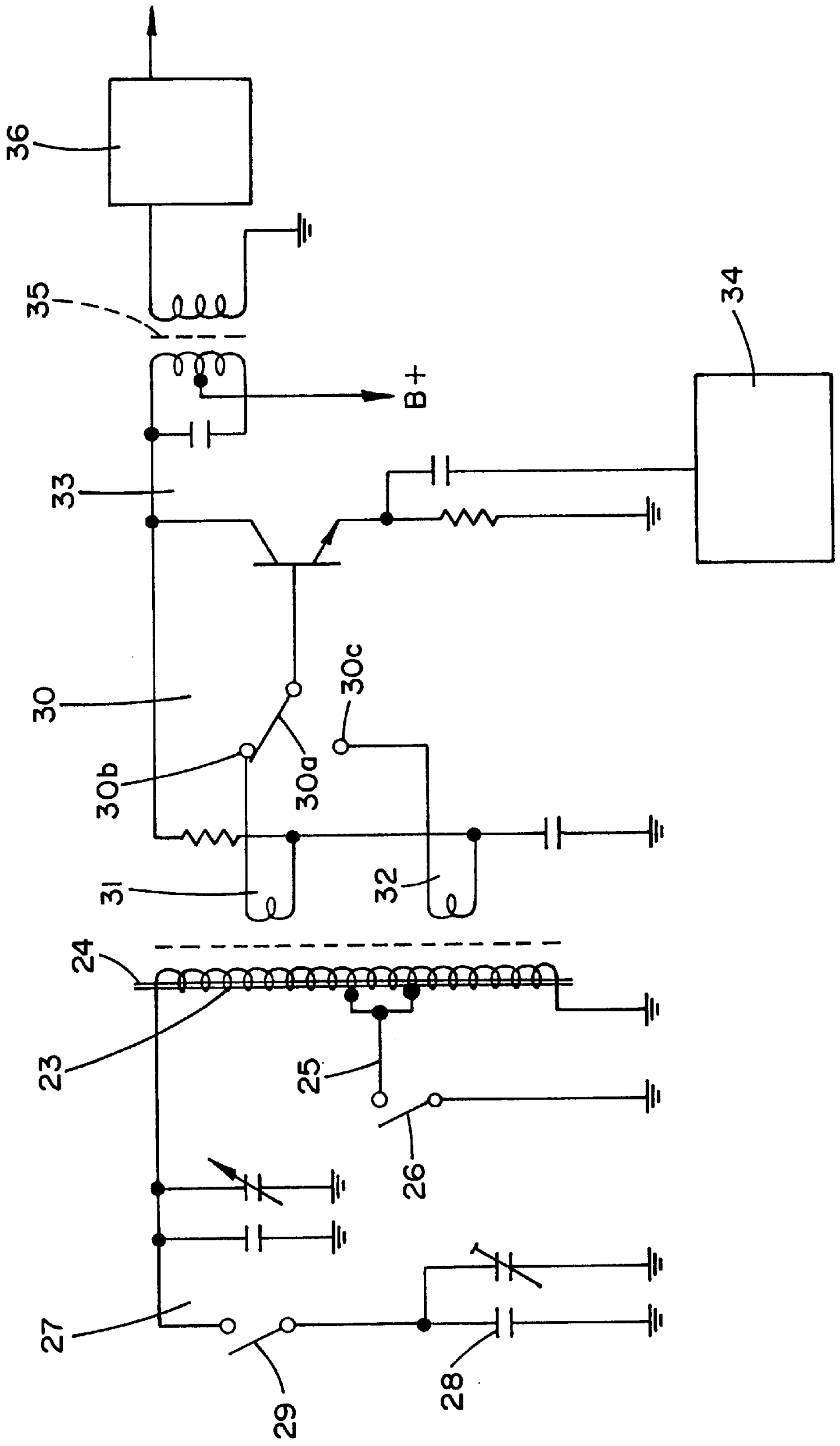
FIG. 8 (PRIOR ART)
FIG. 8 shows a circuit diagram of a communication band switching type antenna in accordance with conventional technology.
Figure 9:
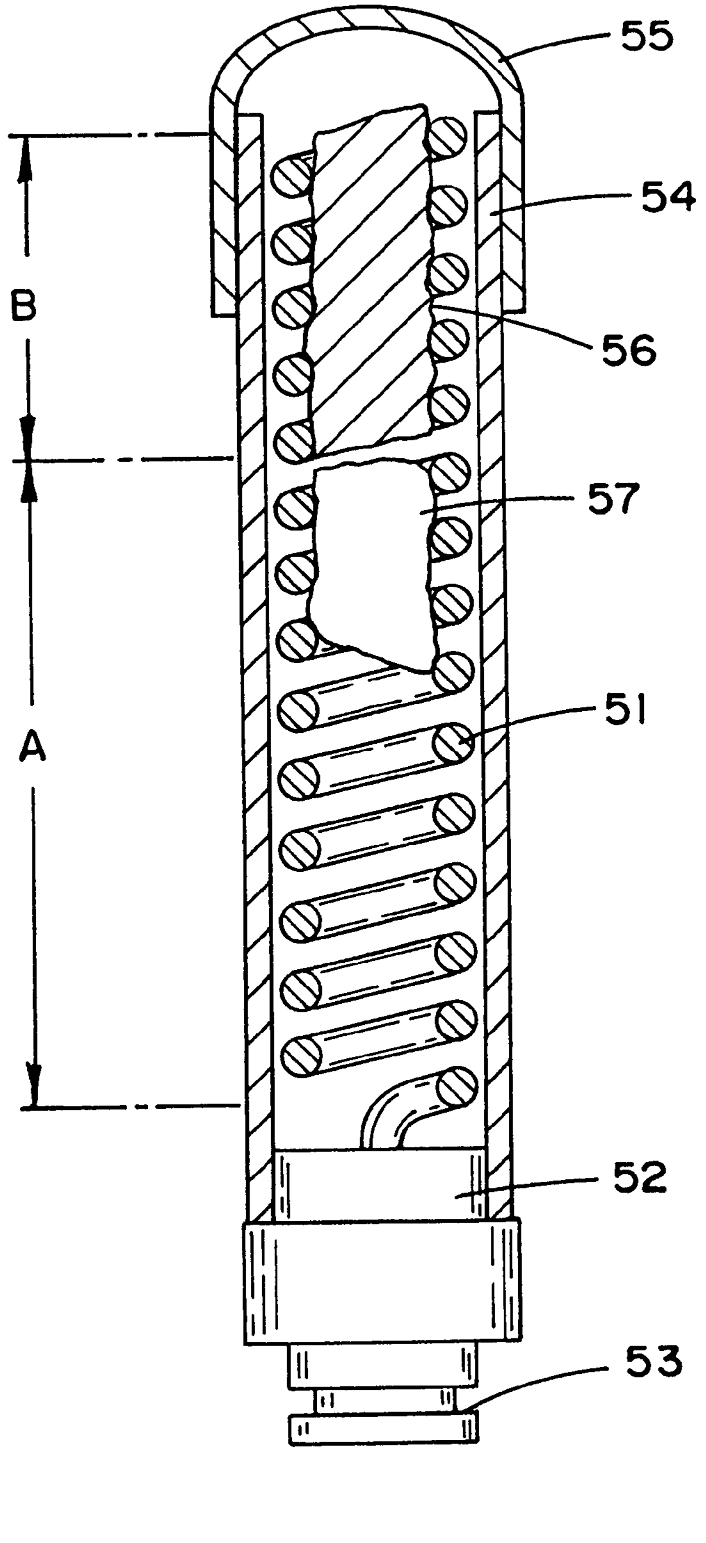
FIG.9 (PRIOR ART)
FIG. 9 shows a cross sectional view of a helical antenna having a variable resonance frequency in accordance with conventional technology.

For example, as shown in FIG. 5, an antenna 9, in which portion of the antenna element has been made straight, or as shown in FIG. 6, an antenna 10 which is formed as to be in a single plane, or as shown in FIG. 7, an antenna 11, in which the antenna element is formed in a zigzag shape, are all capable of switching the resonance frequency of the antenna in the manner of the embodiments described above.

As described above, in accordance with the present invention, by means of switching a communication band switch by means of the reception frequency and altering the resonance frequency of a helical antenna, it is possible to cover a plurality of separate communication bands or a broad communication band, and furthermore, since only one switch is employed for this switching, it is possible to greatly reduce the number of parts, and to achieve a reduction in size of the antenna.

What is claimed is:

1. A helical antenna for a portable radio apparatus comprising:

a screw shaped emitting element having one feeder terminal and a plurality of communication band switching terminals provided with gaps therebetween in the longitudinal direction of the antenna;

a switch for short circuiting and disconnecting two or more terminals among said plurality of communication band switching terminals;

a drive circuit for driving said switch; and a control unit which operates said drive circuit in accordance with externally applied signals;

wherein when a current greater than a predetermined value is applied to said switch the impedance thereof becomes lower to short circuit said communication band switching terminals; and said drive circuit applies a current greater than said predetermined value to said switch when said drive circuit receives a switching signal from said control unit and said control unit generates simultaneously said switching signal for changing resonance frequency of the antenna and channel data for determining reception frequency of a receiver.

2. A helical antenna for the portable radio apparatus according to claim 1, wherein one of said communication band switching terminals is made common with the feeder terminal.

3. A helical antenna for the portable radio apparatus according to claim 1, wherein said switch shorts circuits or disconnects two or more terminals among said plurality of communication band switching terminals by means of a semiconductor switch having an opening and closing operation as a result of signals directly supplied from the control unit.

4. A helical antenna for the portable radio apparatus according to claim 1, wherein a portion of said antenna is made straight.

5. A helical antenna for the portable radio apparatus according to claim 1, wherein an antenna element of said antenna is bent a plurality of times in a co-planar manner.

6. A helical antenna for the portable radio apparatus according to claim 1, wherein one end of said screw shaped emitting element is said feeder terminal and the other end thereof is free.

* * * * *